(12) United States Patent
Mendoza et al.

(10) Patent No.: US 11,253,914 B2
(45) Date of Patent: Feb. 22, 2022

(54) BATTERY GRID CONTINUOUS CASTING SHOE AND MACHINE

(71) Applicant: Wirtz Manufacturing Company, Inc., Port Huron, MI (US)

(72) Inventors: Roel Mendoza, Palms, MI (US); Aleksandar Mrdenovic, Fort Gratiot, MI (US); Michael Romeo, St. Clair, MI (US)

(73) Assignee: Wirtz Manufacturing Co., Inc., Port Huron, MI (US)

( * ) Notice: Subject to any disclaimer, the term of this patent is extended or adjusted under 35 U.S.C. 154(b) by 0 days.

(21) Appl. No.: 17/043,942

(22) PCT Filed: Apr. 12, 2019

(86) PCT No.: PCT/US2019/027144
§ 371 (c)(1),
(2) Date: Sep. 30, 2020

(87) PCT Pub. No.: WO2019/200205
PCT Pub. Date: Oct. 17, 2019

(65) Prior Publication Data
US 2021/0023613 A1 Jan. 28, 2021

Related U.S. Application Data

(60) Provisional application No. 62/656,633, filed on Apr. 12, 2018.

(51) Int. Cl.
*B22D 25/04* (2006.01)
*B22D 11/06* (2006.01)

(52) U.S. Cl.
CPC .......... *B22D 25/04* (2013.01); *B22D 11/0634* (2013.01); *B22D 11/0611* (2013.01); *B22D 11/0642* (2013.01)

(58) Field of Classification Search
CPC . B22D 25/04; B22D 11/0634; B22D 11/0611; B22D 11/0642; B22D 11/0602; B22D 11/0648; B22D 11/0651; B22D 11/0654; B22D 11/0677; B22D 11/0685; B22D 11/0694; B22D 11/06; B22D 11/10; B22D 11/103
See application file for complete search history.

(56) References Cited

U.S. PATENT DOCUMENTS

| 4,544,014 A | 10/1985 | McLane et al. |
| 4,545,422 A | 10/1985 | McLane et al. |
| 5,015,438 A | 5/1991 | Ashok et al. |
| 5,497,822 A | 3/1996 | Schenk |

FOREIGN PATENT DOCUMENTS

CN 102240785 11/2011

OTHER PUBLICATIONS

PCT/US2019/027144 International Search Report and Written Opinion dated Jul. 1, 2019 (dated Jul. 1, 2019).

*Primary Examiner* — Kevin P Kerns
*Assistant Examiner* — Steven S Ha
(74) *Attorney, Agent, or Firm* — Reising Ethington P.C.

(57) ABSTRACT

A shoe for dispensing molten lead into a mold cavity of rotating drum to continuously cast a web of a plurality of serially connected grids for lead acid batteries. The shoe may have an elongate orifice slot in a face confronting the drum, a molten lead supply slot opening into an upper recessed portion of the orifice slot and an excess molten lead return slot communicating with the recessed portion downstream of the supply slot.

25 Claims, 5 Drawing Sheets

BATTERY GRID CONTINUOUS CASTING SHOE AND MACHINE

REFERENCE TO RELATED APPLICATIONS

This application claims the benefit of U.S. Provisional Application Ser. No. 62/656,633 filed on Apr. 12, 2018, the entire contents of which are incorporated herein by reference in its entirety.

TECHNICAL FIELD

This invention relates to lead acid battery grids and more particularly to a battery grid continuous casting shoe and machine.

BACKGROUND

Various machines for casting battery grids in a continuous manner have been developed. Some of these machines have a rotary cast iron drum with a mold cavity of a plurality of the desired battery grid pattern formed in a cylindrical peripheral surface of the drum and a shoe of a highly thermally conductive metal such as aluminum-bronze or steel is positioned in confronting and close fitting relationship with an arcuate segment of the drum. The shoe typically has a generally axially extending orifice slot opening onto the face of the drum. Typically, excess molten lead is supplied at a super atmospheric pressure to the orifice slot to fill the portion of the mold of the drum rotating past the slot to thereby continuously cast an elongated web or strip of connected successive battery grids. The excess molten lead is directed back to a lead pot of a furnace which melts the lead supplied to the orifice and maintains it in a molten condition in the pot.

Such a continuous casting machine and shoe is disclosed in U.S. Pat. No. 4,415,016 assigned to the applicant of this patent application. Prior art shoes for battery grid continuous casting machines are also disclosed in U.S. Pat. Nos. 4,544,014 and 4,545,422 assigned to the applicant of this application. This type of machine produces satisfactory battery grids when operated under carefully controlled conditions particularly if the temperatures of portions of the shoe and the drum are maintained within selected narrow ranges. However, various problems have occurred when attempting to consistently produce grids of the highest quality at a high speed or rate of production over a long period of continuous machine operation. When operating over a prolonged period of continuous production, some of the problems have been flashing of lead between the grooves of the drum mold and thus flashing on the wires of the grid, lack of complete filling of the drum mold grooves with molten lead and thus undersized grid wires and cold welded seams or junctions of the lug with adjacent wires of the cast grid (knitted or cold weld joints) as distinguished from a homogeneously fused joint of the lug with the adjacent wire portions of the cast grid. These knitted or cold formed joints produce grids with both poor structural quality and a significantly reduced current carrying capacity of the grid.

SUMMARY

In at least some implementations, a casting shoe for a battery grid continuous casting machine may include a body with a longitudinally elongate orifice slot opening into a face configured to confront a rotary drum with a mold cavity therein, a longitudinally elongate molten lead supply slot opening into the orifice slot and upstream of the face relative to the direction of flow of molten lead into the orifice slot, and a longitudinally elongate excess molten lead return slot separate from the supply slot and opening into the orifice slot downstream of the supply slot. In at least some implementations, the supply slot may be inclined downwardly relative to the direction of rotation of the drum past the orifice slot. In at least some implementations, the return slot from the orifice slot may be inclined downwardly relative to the direction of rotation of the drum past the orifice slot.

In at least some implementations the body may include a molten lead supply passage communicating with the supply slot upstream of and at least substantially throughout the longitudinal extent of the supply slot. The supply passage may be configured to receive molten lead through an inlet and to discharge through an outlet excess molten lead not supplied to the orifice slot.

In at least some implementations, the body may include a molten lead return passage separate from the supply passage and communicating with the return slot downstream of and at least substantially throughout the longitudinal length of the return slot. The return passage may have a molten lead inlet adjacent one end and be configured to receive excess molten lead from the return slot and to discharge it though an outlet adjacent the other end of the return passage. The return passage may be configured to receive molten lead through its inlet and to discharge such molten lead and excess molten lead from the return slot through the outlet of the return passage.

In at least some implementations, an axially elongate molten lead return supply tube may be received in the return passage with an outside diameter smaller than the inside diameter of the return passage and with a nozzle adjacent the molten lead outlet of the return passage. The return supply tube may have spaced apart outlet passages through the wall of the tube configured to discharge molten lead into the return passage.

BRIEF DESCRIPTION OF THE DRAWINGS

The following detailed description of certain embodiments and best mode will be set forth with reference to the accompanying drawings, in which.

DETAILED DESCRIPTION

Figure 1:
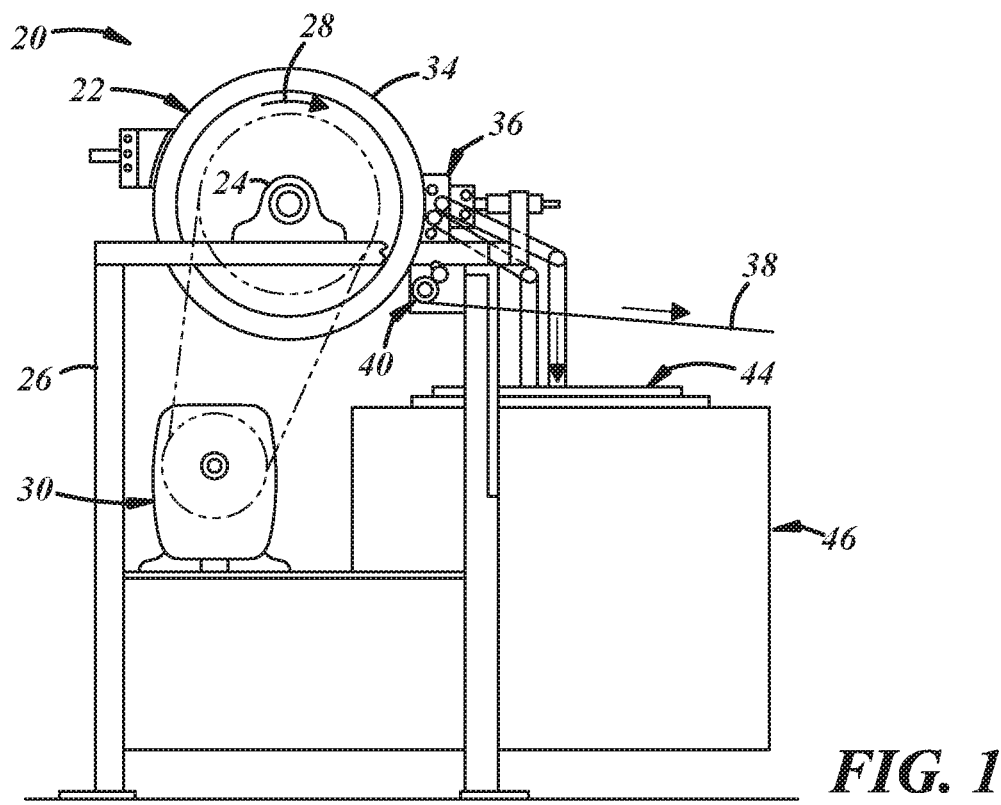
FIG. 1 is a side elevational view of a machine for continuously casting battery grids.
Figure 2:
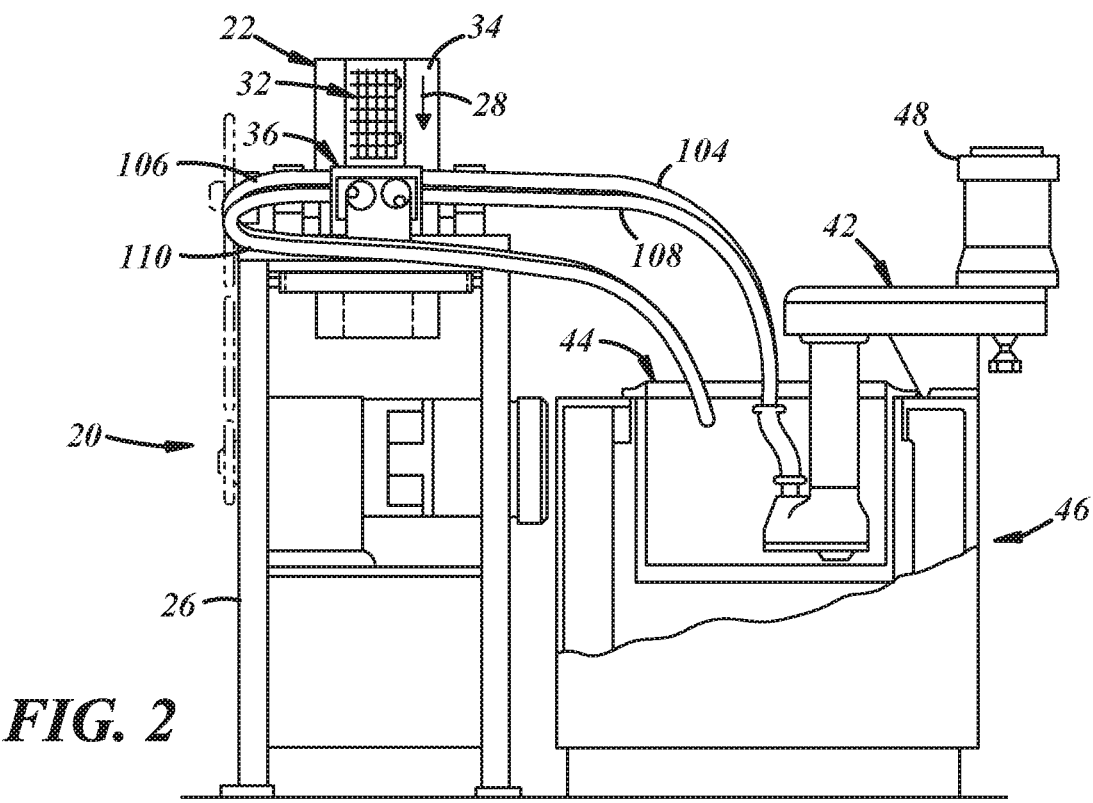
FIG. 2 is an in view of the continuous casting machine of FIG. 1.

In the drawings, FIGS. 1 and 2 illustrate a battery grid continuous casting machine 20 with a battery grid casting drum 22 journaled for rotation in bearing assembly 24 carried by a frame 26. In use the drum is driven for rotation in the direction indicated by arrow 28 in FIG. 1 by an electric motor 30 which may be a variable speed electric motor. A mold cavity 32 with a desired predetermined battery grid pattern is machined in an outer peripheral cylindrical surface 34 of the drum. Typically, the mold cavity may have a whole number of a plurality of the predetermined desired grid pattern in the cylindrical surface of the drum. In use molten lead may be supplied through a shoe 36 into a confronting portion of the mold cavity 32 of the rotating drum to form a continuous strip or web 38 of connected battery grids which are removed from the drum downstream of the shoe such as by passing around a roller 40 downstream of the shoe.

Molten lead at a super atmospheric pressure may be supplied to the shoe by a pump 42 from a lead melting pot 44 of a furnace 46. The pump may be driven by a variable speed electric motor 48 the speed of which may be varied and controlled to select, vary as needed and control the super atmospheric pressure and/or flow rate at which molten lead is supplied to the shoe. Excess molten lead may be returned from the shoe to the lead pot 44.

Figure 3:
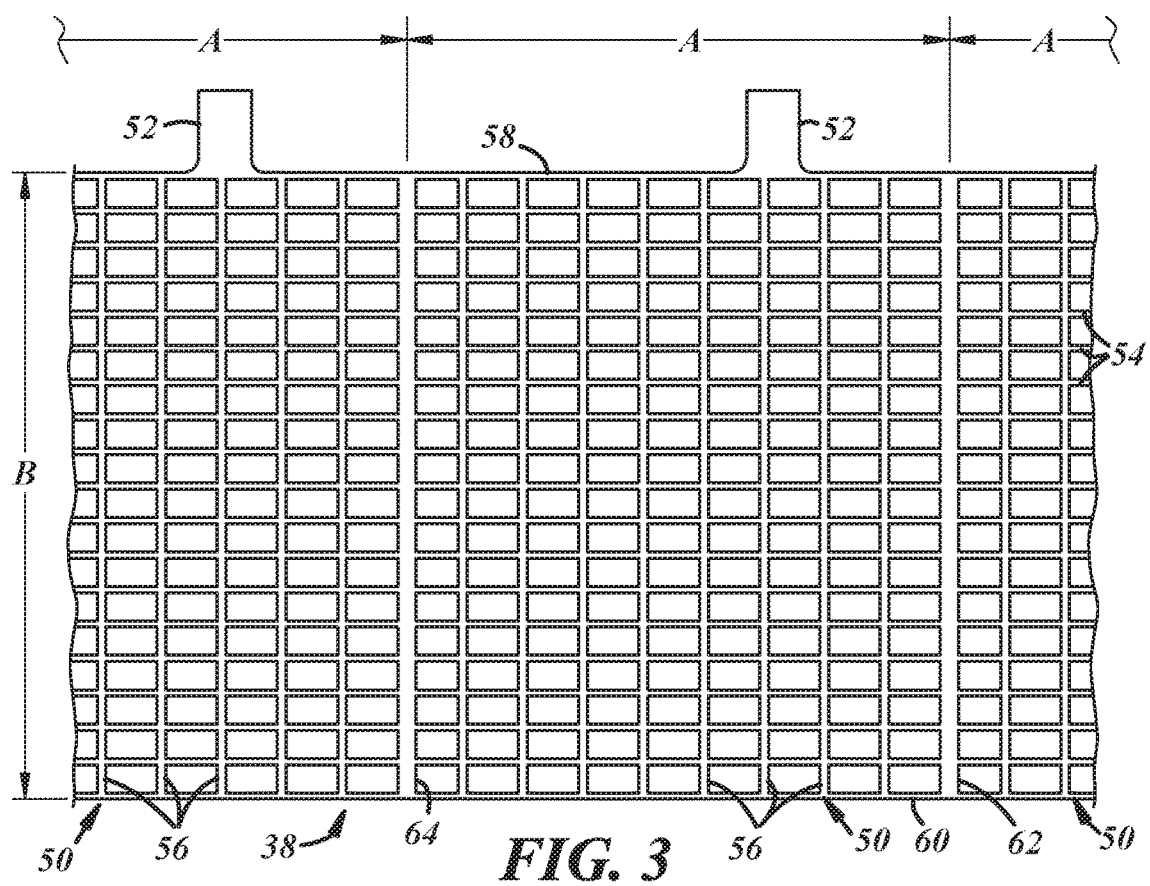
FIG. 3 is a fragmentary plan view of a strip or web of continuously cast battery grids.
Figure 4:
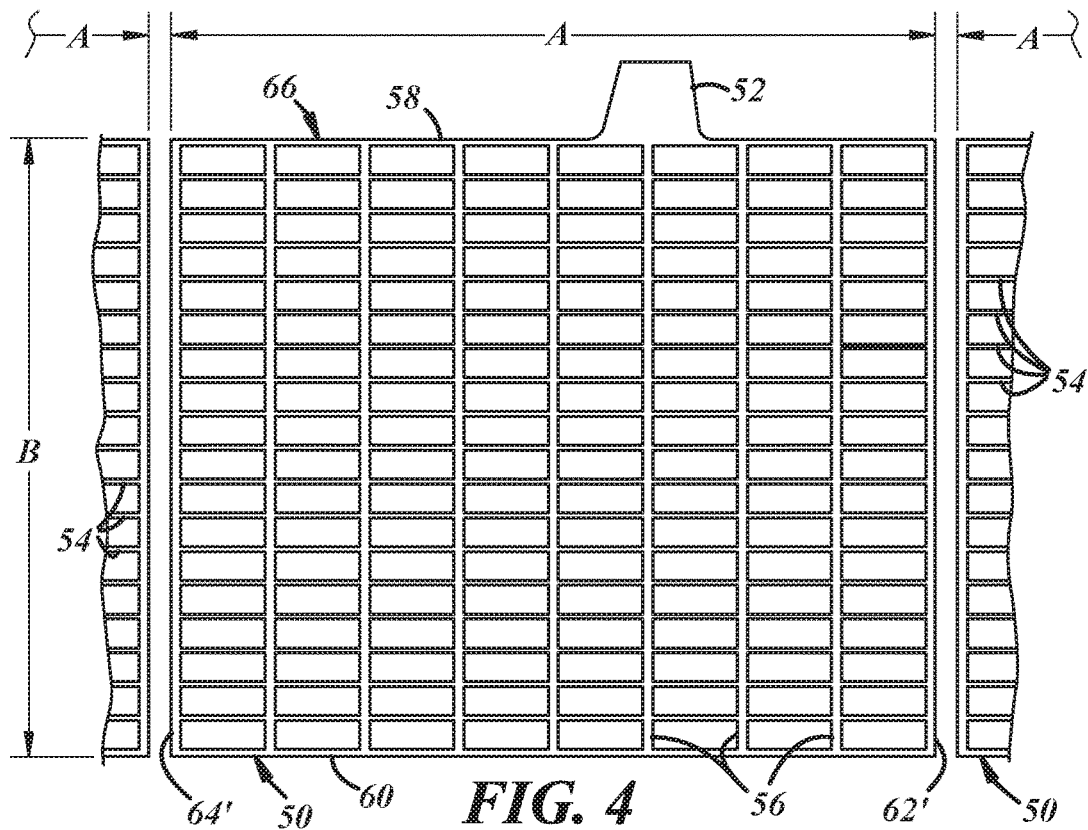
FIG. 4 is a fragmentary plan view of the separation of individual battery grids from the continuous web of FIG. 3.

As shown in FIG. 3, the cast web 38 may have a plurality of connected battery grids 50 typically of the same longitudinal web length A and web transverse width B and each with a connector lug 52. As shown in FIG. 4, the web may be separated into separate individual grids 50. The web and thus each grid 50 may have generally longitudinally extending and laterally spaced apart grid wires 54 and generally laterally or transversally extending and longitudinally spaced apart grid wires 56. The web and thus each grid may include longitudinally extending wires 58 and 60 which in an individual grid may be top and bottom frame wires respectively and laterally or transversely extending wires 62 and 64 which in an individual grid may be end or side frame wires. In the web the lateral wires 62 and 64 may have a longitudinal width at least twice that of the intermediate lateral wires 56 so that when severed and separated into individual grids the end wires 62' and 64' may desirably have a width equal to or greater than the immediate lateral wires 56. The top and bottom longitudinal wires 58 and 60 may have a greater width and/or depth than the intermediate longitudinal wires 54. A peripheral frame 66 of each grid formed by the interconnected wires 58, 60, 62', and 64' may provide each grid with sufficient structural strength to be readily further processed and assembled into a battery.

As shown in FIG. 2, the mold cavity 32 in the drum may have circumferentially continuous and axially spaced apart grooves in its cylindrical peripheral surface which form the cast longitudinal wires 54, 58, and 60 of the web and after severing the individual longitudinal grid wires. The mold cavity 32 may also have generally axially extending and circumferentially spaced apart grooves in its cylindrical surface which form the lateral wires 56, 62, and 64 of the cast web and after severing of each individual grid 50. The mold cavity 32 in the cylindrical surface of the drum will also have an appropriate recess for casting a lug 52 as part of each grid 50 of the web of continuous grids. Typically, each grid of the as cast web will have essentially the same longitudinal length A and transverse width B and after separation from the web each individual grid will have substantially the same length A and width B.

Skilled persons understand and know that the intermediate lateral wires 56 may be arranged in other patterns in which they are not substantially perpendicular to the longitudinal wires 54 and the intermediate lateral wires 56 may extend at an angle with respect to the bottom and top wires 58 and 60 and may be inclined to extend toward the lug 52.

Skilled persons know how to design and construct a variety of continuous casting machines and drums with a suitable mold cavity for continuously casting a web of a wide variety of a plurality of connected grids and thus the construction of machine 20, rotary drum 22, and furnace 46 will not be further described herein. One continuous casting machine is disclosed in U.S. Pat. No. 4,509,581 which is incorporated herein in its entirety by reference.

Figure 5:
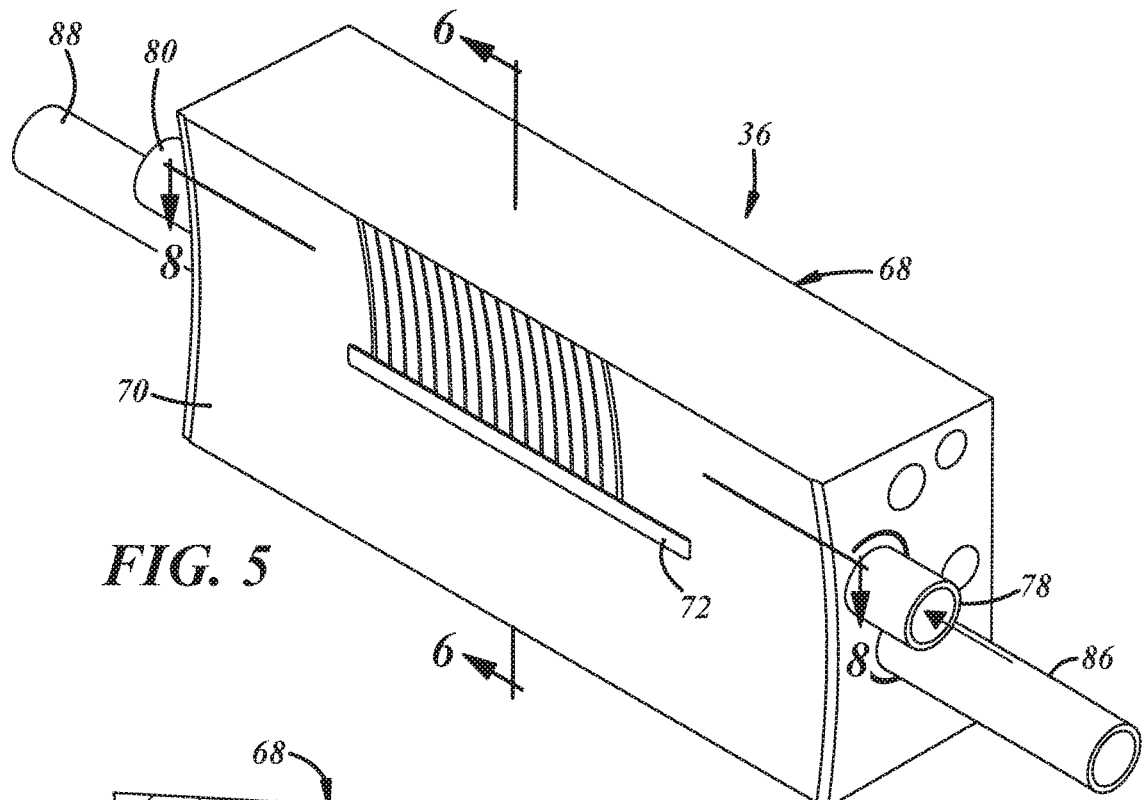
FIG. 5 is a perspective view of one form of a continuous casting shoe which may be used in the machine of FIG. 1.
Figure 6:
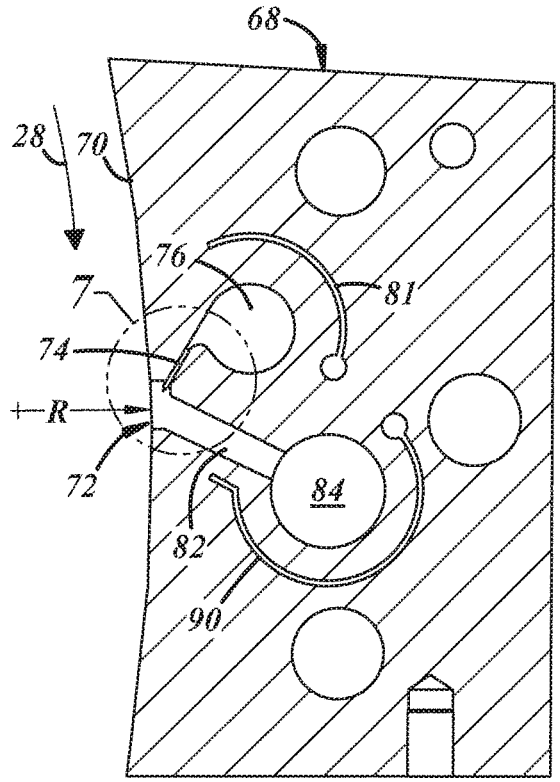
FIG. 6 is an enlarged sectional view taken on line 6-6 of FIG. 5.
Figure 7:
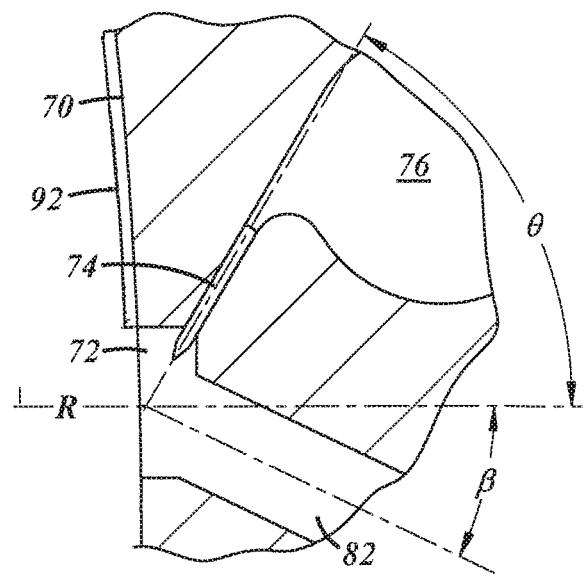
FIG. 7 is an enlarged fragmentary view of the portion of FIG. 6 in the circle 7.

FIG. 5 illustrates the shoe 36 for dispensing molten lead into a cavity of a rotating drum for continuously casting a web of a plurality of connected grids. As shown in FIGS. 5 and 6 this shoe may have a body 68 with a generally arcuate front face 70 with an axially elongate orifice slot 72 therein which may confront a rotating drum (such as drum 22) and may extend axially or longitudinally generally parallel to the axis of rotation of the drum. The longitudinal length of the orifice slot 72 may extend across the entire axial width of the mold cavity 32 including the lug portion of the mold cavity. In use, excess molten lead may be supplied to the orifice slot 72 through a longitudinally extending supply slot 74 which may open into an upper recessed portion of the orifice slot 72 and may extend longitudinally substantially the whole longitudinal length of the orifice slot. Desirably the supply slot is inclined downwardly relative to the direction of rotation of the drum past the orifice slot to facilitate flow of both molten lead into the portion of the mold cavity passing the slot and the return of excess molten lead from the orifice slot. As shown in FIG. 7, the supply slot 74 may be inclined downwardly (relative to the direction of rotation of the drum) at an acute included angle Ø relative to a radius R of the drum extended through the arcuate center of the orifice slot 72 in the range of about 50° to 70°, desirably 55° to 65° and preferably about 60°.

As shown in FIGS. 6 and 7, the upstream end of this supply slot 74 opens into a molten lead supply passage 76 which may extend axially throughout the length of the shoe body 68 and communicate with an inlet connector 78 at one end of the body and an outlet connector 80 at the other end of the body. Generally, radially outward of the supply passage, an arcuate isolator slot 81 may extend generally axially throughout the body to decrease the thermal transfer of heat from molten lead in the supply passage to the body of the shoe.

In use, more molten lead is supplied through the supply slot 74 to the orifice slot 72 then is dispensed into the mold cavity 32 of the rotating drum and the excess molten lead is returned from the orifice slot through a return slot 82 which communicates with the recess of the orifice slot downstream of the supply slot 74 and is inclined downwardly away from the orifice slot 72 relative to the direction of rotation of the drum. As shown in FIG. 7 the return slot 82 may be inclined downwardly away from the orifice slot 72 at an acute included angle β relative to an extension of the radius R of the drum through the arcuate center of the orifice slot 72 that may be in the range 20° to 40°, desirably 25° to 35° and preferably about 30°. This return slot is longitudinally elongate and desirably may extend the entire longitudinal length of the recess of the orifice slot 72. The minimum cross sectional area of the return slot 82 may be on the order of four to ten times greater than the minimum cross sectional area of the supply slot 72, desirably six to eight times greater than that of the supply slot, and preferably about seven times greater than that of the supply slot.

The downstream end of the return slot 82 may communicate with and open into a return passage 84 extending generally axially through the body of the shoe and communicating at one end with a molten lead inlet connector 86 and at the other end with a molten lead outlet connector 88. An arcuate isolator slot 90 generally radially outward of the return passage may extend through the body 68 of the shoe to reduce heat transfer from molten lead in the return passage and the return slot to the shoe body.

Figure 8:
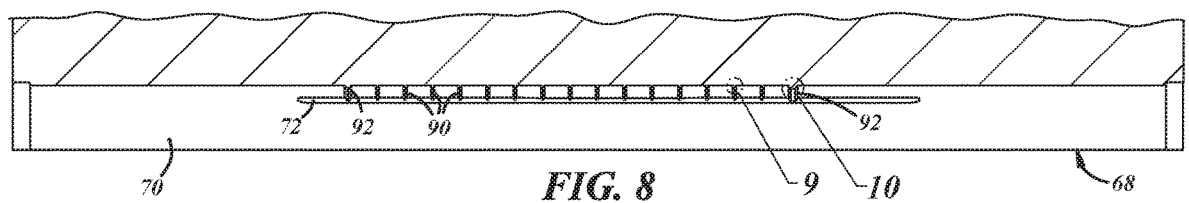
FIG. 8 is an enlarged fragmentary sectional view taken on line 8-8 of FIG. 5.
Figure 9:
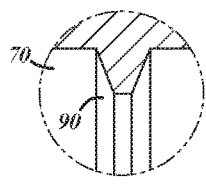
FIG. 9 is an enlarged fragmentary view of the portion of FIG. 8 in the circle 9.
Figure 10:
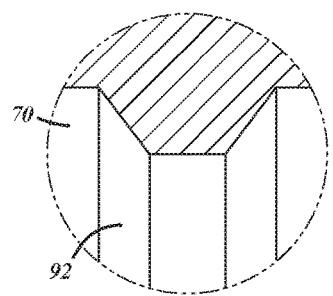
FIG. 10 is an enlarged fragmentary view of the portion of FIG. 8 in the circle 10.

When casting a continuous web of battery grids, molten lead dispensed from the orifice slot 72 into the circumferential grooves of the drum mold cavity 32 tends to flow upstream counter to direction of rotation of the drum. Therefore, to inhibit this upstream flow, as shown in FIGS. 5 and 8 the shoe has a series of axially spaced apart ribs 90, 92 extending circumferentially upstream from the upper edge of the orifice slot and projecting radially outwardly from the arcuate face 72 of the shoe with each rib in cross section configured to be closely received in an associated circumferential groove of the mold cavity 32 in which one of the longitudinal grid wires is cast. As shown in FIG. 9, the ribs 90 received in the cavity grooves in which the intermediate longitudinal wires 54 are cast may be smaller in or otherwise have a different cross sectional area than that of the ribs 92 (FIG. 10) received in the circumferential grooves in the mold cavity in which the top and bottom longitudinal wires 58, 60 of the grid are cast. Typically, a top wire 58 of a grid and its associated rib 92 may have a larger cross sectional area than that of a bottom wire 60 and its associated rib. The exterior surfaces of each rib 90, 92 may be designed and constructed to have a slight clearance with the corresponding surface of its associated groove of the mold cavity 32 of about 0.000 to 0.003 thousands of an inch.

As shown in FIG. 5, the orifice slot 72 and the associated portions of the supply and return slots 74, 82 extend generally axially or longitudinally significantly beyond or outboard of the mold cavity 32 groove forming the top frame wires 58 to extend across and desirably slightly beyond the axial extent of the recesses of the mold cavity forming the lug 52 of the battery grids of the continuous web. It has been empirically determined that the construction, arrangement and orientation of the orifice, supply and return slots 72, 74, 82 improves the casting and integrity of each lug 52 and the homogeneity of its merging into and attachment with the associated frame wire 58 of the cast grids and significantly decreases if not essentially eliminates any cold welding and seams between them. This is believed to be due to significantly less upfill or upflow of molten lead relative to the direction of rotation the drum as the initial portion of the mold cavity recess forming the cast lug 52 moves downwardly into registration with this portion of the orifice slot 72 and the molten lead entering this recess remains in a molten condition for a sufficient period of time to result in a flowing together and homogeneous casting of the lug with the adjoining frame wire as this wire is being cast and solidifies throughout the longitudinal and lateral extent of the attachment and merging of the lug into this frame wire. Regardless of any theoretical explanation, it has been empirically determined that improvement of this cast lug and lug wire interface occurs even though the temperature of the molten lead supplied to the shoe is at a lower temperature than that of prior art shoes.

The minimum cross sectional flow area of the orifice slot 72 through the confronting face is significantly greater than the minimum cross sectional flow area of the supply slot 74 and in some implementations may be in the ratio or range of 8:1 to 15:1 and desirably in the ratio range of 9:1 to 11:1. In one practical implementation the orifice slot has a width of 0.270 of an inch, the supply slot has a width of 0.025 of an inch and each has a longitudinal length of 4.787 inches. In at least some implementations, a minimum cross sectional flow area of the orifice slot 72 may be substantially equal to or greater than the minimum cross sectional flow area of the return slot 82 and may be in the ratio or range of 1:1 to 3:1 and desirably in the ratio or range of 1:1 to 2:1. In one practical implementation the orifice slot 72 has a width of 0.270 of an inch, the return slot 82 has a width of 0.180 of an inch and each has a longitudinal length of 4.787 inches. In at least some implementations, the minimum cross sectional flow area of the return slot 82 is substantially greater than the minimum cross sectional flow area of the supply slot 74 and may be in the ratio or range of 5:1 to 10:1 and desirably 6:1 to 9:1. In one practical implementation the return slot 82 has a width of 0.180 of an inch, the supply slot has a width of 0.025 of an inch and each has a longitudinal length of 4.787 inches. In at least some implementations a shoe may be used in a continuous casting machine to produce a web of a plurality of continuously cast grids each having for example a longitudinal length A of 147 mm and a nominal transverse width B of 132 mm, a thickness of 1 mm, and weighing about 43 grams of a lead alloy.

The orifice slot 72 and associated separate supply and return slots 74,82 extending longitudinally or axially across the mold cavity 32 of the drum has the significant practical advantages of providing longer periods of continuous casting of webs of connected battery grids without having to clean out and remove dross, solidified lead particles and other contaminants from the shoe, the ability to continuously cast webs at a lower molten lead temperature and lower shoe temperature, a significantly increased maximum production rate, improved grain structure of the lead of the cast grids, significantly improved lug structure and integrity of the cast grids, improved control of the continuous casting process, and improved castability of lead alloys particularly lead alloys commonly used in lead acid battery grids including lead antimony alloys. As used in this description and the claims, the terms lead, molten lead and cast lead include without limitation both essentially pure metallic lead and a wide variety of lead alloys including without limitation lead alloys with one or more of calcium, antimony, selenium, copper, tin, aluminum, silver, arsenic, barium, bismuth, etcetera.

Figure 14:
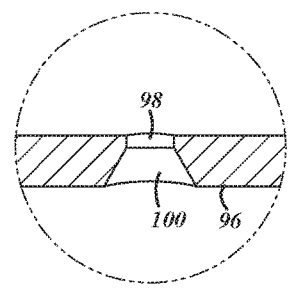
FIG. 14 is an enlarged fragmentary view of the portion of FIG. 13 in the circle 14.
Figure 11:
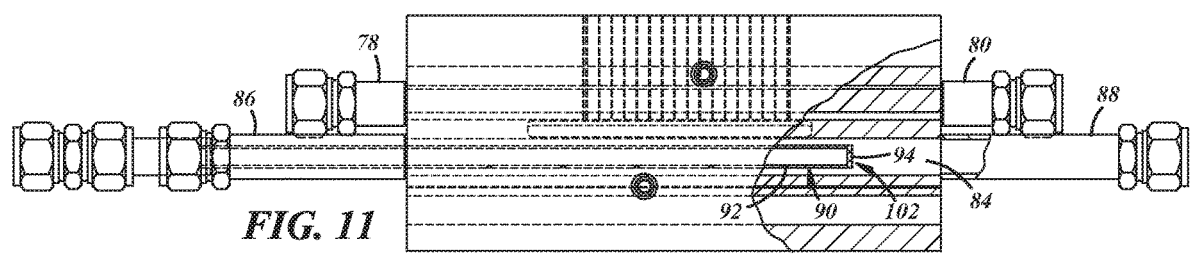
FIG. 11 is a back view of the shoe of FIG. 5 with a portion broken away and in section to illustrate an optional return passage molten lead return tube in the shoe.
Figure 12:
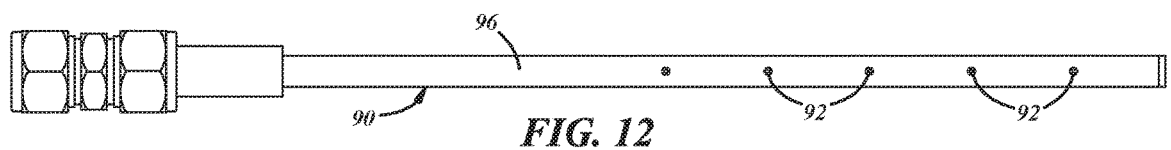
FIG. 12 is a side view of the return tube.
Figure 13:
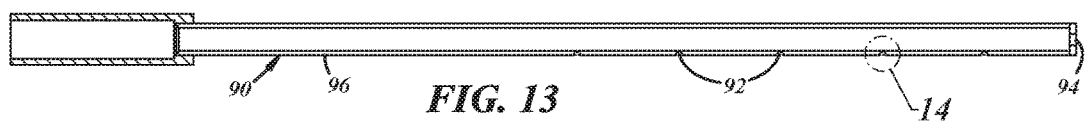
FIG. 13 is a sectional view of the return tube.

FIG. 11 illustrates an optional addition to the shoe 36 of a return passage molten lead return tube 90 which improves the return of excess lead from the orifice slot 72 through the return slot 82. In use, molten lead is supplied to the return passage 84 through this return tube which when received in the return passage may dispense molten lead through both a series of longitudinally spaced apart holes or apertures 92 through its side wall as shown in FIGS. 11-13 and/or through a restricted orifice 94 in the downstream end of the tube. As shown in FIG. 14, the holes 92 in the side wall 96 of the tube may have a cylindrical bore 98 which merges into a frustoconical opening 100 outwardly through the wall.

The end of the tube 90 with the restricted orifice 94 may be disposed near the outlet end of the return passage 84 and in use is believed to provide a nozzle which with the return passage 84 forms an eductor or jet pump 102 which decreases the pressure of the molten lead in the orifice slot and increases the flow rate at which excess molten lead may be removed from the recess of the orifice slot 72 through the return slot 82. Regardless of any theoretical explanation, the use of this return tube improves the casting of the lugs 52 and the adjoining portion of the wires 58 and permits a higher flow rate of excess molten lead through the shoe which is believed to permit the supply of molten lead to the orifice slot 72 at a lower temperature and thus molten lead in the mold cavity 32 solidifies in less time which enables a higher or faster production rate of cast webs of continuous grids. In some applications this may permit molten lead to be supplied to the supply passage 76 at a temperature in the range of 50° C. to 80° C. above the solidification temperature of the lead and enable the maximum production rate of cast webs to be increased by 30% to 50% greater than that achieved with prior art shoes of continuous casting machines. This also improves the integrity of the cast lug 52 and the metallurgical grain structure of the cast grids.

In use of the shoe 36 in a continuous casting machine it is desirable to be able to supply molten lead at different pressures and different flow rates to the supply passage 76 and the separate return passage 84. One way in which this may be readily achieved is to use separate molten lead pumps 42 in a common furnace 46 or separate furnaces with separate pumps to supply molten lead to each of these passages. For example, the outlet of a first pump 42 may be connected by a suitable conduit 104 to the inlet 78 of the supply passage 76 and the outlet 80 of the supply passage may be connected by a suitable conduit 106 to return excess molten lead to the melting pot 42 of the furnace 46. A second pump (not shown) of either the same or a separate furnace may be connected by a suitable conduit 108 to the inlet 86 of the separate return passage 84 and molten lead flowing through the outlet 88 of this passage may be returned by a suitable conduit 110 to a melting pot 44 of either the same or a second furnace. If each pump is driven by a separate variable speed electric motor 30 the flow rate and pressure of the molten lead supplied to each of the supply passage 76 and return passage 84 may be readily varied and controlled as desired to optimize the production rate and the quality of the battery grids 50 of a continuously cast web produced by the casting machine in which the shoe 36 is utilized.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. For a battery grid continuous casting machine with a rotary drum with a mold cavity therein, a casting shoe comprising:
   a body with a face configured to confront the rotary drum and extending generally axially over at least an axial extent of the mold cavity of the rotary drum;
   a longitudinally elongate orifice slot in the body and opening into the confronting face of the body and extending longitudinally across the axial extent of the mold cavity;
   a longitudinally elongate molten lead supply slot opening into the orifice slot along at least substantially a longitudinal extent of the orifice slot and upstream of the orifice slot of the confronting face relative to the direction of flow of molten lead through the supply slot and into the orifice slot;
   a molten lead supply passage in the body and communicating with the supply slot upstream of the orifice slot and at least substantially throughout a longitudinal extent of the supply slot;
   a longitudinally elongate excess molten lead return slot separate from the supply slot and opening into the orifice slot downstream of the supply slot and extending along at least substantially the longitudinal extent of the orifice slot; and
   a return passage in the body separate from the supply passage and the supply slot, the return passage communicating with the return slot downstream of the orifice slot and at least substantially throughout a longitudinal length of the return slot, the return passage having a molten lead inlet adjacent one of its ends, a molten lead outlet adjacent the other of its ends, and being configured to receive excess molten lead from the return slot downstream of the orifice slot and to discharge such excess molten lead from the return slot through the outlet of the return passage.

2. The casting shoe of claim 1, wherein the supply slot is inclined downwardly relative to a direction of rotation of the rotary drum past the orifice slot at an acute angle relative to an imaginary radius of the rotary drum extending through a center of the generally circumferential width of the opening of the orifice slot into the confronting face.

3. The casting shoe of claim 2, wherein the acute angle of the supply slot is in the range of 50°-70°.

4. The casting shoe of claim 2, wherein the return slot from the orifice slot is inclined downwardly relative to the direction of rotation of the rotary drum past the orifice slot and away from the orifice slot at an acute angle relative to an imaginary radius of the rotary drum extending through the center of the generally circumferential width of the opening of the orifice slot into the confronting face.

5. The casting shoe of claim 1, wherein the opening of the return slot from the orifice slot is inclined downwardly relative to the direction of rotation of the rotary drum past the orifice slot and away from the orifice slot at an acute angle relative to an imaginary radius of the rotary drum extending through a center of the generally circumferential width of the opening of the orifice slot into the confronting face.

6. The casting shoe of claim 5, wherein the acute angle of the return slot is in the range of about 20°-30°.

7. The casting shoe of claim 1, wherein the supply passage has an inlet adjacent one of its ends and an outlet adjacent the other of its ends.

8. The casting shoe of claim 7, wherein the supply passage extends generally axially through the body and is configured to receive molten lead at a super atmospheric pressure through its inlet and to discharge through its outlet excess molten lead not supplied through the supply passage to the orifice slot.

9. The casting shoe of claim 7, which also comprises the body having axially spaced apart ends, and the outlet of the supply passage and the outlet of the return passage are both adjacent the same one of the ends of the body.

10. The casting shoe of claim 9, which also comprises an axially elongate molten lead return supply tube received in the return passage and having an outside diameter smaller than an inside diameter of the return passage and a nozzle adjacent the molten lead outlet of the return passage.

11. The casting shoe of claim 7, which also comprises an isolation slot through the body and disposed generally radially outward of the supply passage.

12. The casting shoe of claim 1, which also comprises the body having axially spaced apart ends, and an inlet of the supply passage and the inlet of the return passage are both adjacent the same one of the ends of the body.

13. The casting shoe of claim 12, wherein the return passage is configured to receive a supply of molten lead through its inlet and to discharge such molten lead and excess molten lead from the return slot through the outlet of the return passage.

14. The casting shoe of claim 13, which also comprises an axially elongate molten lead return supply tube received in the return passage and having an outside diameter smaller than an inside diameter of the return passage and a nozzle adjacent the molten lead outlet of the return passage.

15. The casting shoe of claim 12, which also comprises an axially elongate molten lead return supply tube received in the return passage and having an outside diameter smaller than an inside diameter of the return passage and a nozzle adjacent the molten lead outlet of the return passage.

16. The casting shoe of claim 15, wherein the molten lead return supply tube also has a plurality of spaced apart outlet passages through a side wall of the tube through which molten lead may be discharged into the return passage.

17. The casting shoe of claim 12, which also comprises an isolation slot through the body and disposed generally radially outward of the return passage.

18. The casting shoe of claim 1, wherein the ratio of a minimum cross-sectional flow area of the orifice slot through the confronting face to a minimum cross-sectional flow area of the supply slot into the orifice slot is in the range of 8:1 to 15:1.

19. The casting shoe of claim 18, wherein a minimum cross-sectional flow area of the return slot to a minimum cross-sectional flow area of the supply slot to the is in the range of 5:1 to 10:1.

20. The casting shoe of claim 1, wherein the ratio of a minimum cross-sectional flow area of the orifice slot through the confronting face to a minimum cross-sectional flow area of the supply slot into the orifice is in the range of 9:1 to 11:1.

21. The casting shoe of claim 1, wherein the ratio of a minimum cross-sectional flow area of the orifice slot opening into the confronting face to a minimum cross-sectional flow area of the return slot is in the range of 1:1 to 3:1.

22. The casting shoe of claim 1, wherein the ratio of a minimum cross-sectional flow area of the orifice slot opening into the confronting face to a minimum cross-sectional flow area of the return slot is in the range of 1:1 to 2:1.

23. The casting shoe of claim 1, wherein a minimum cross-sectional flow area of the return slot to a minimum cross-sectional flow area of the supply slot is in the range of 5:1 to 10:1.

24. The casting shoe of claim 1, wherein a minimum cross-sectional flow area of the return slot to a minimum cross-sectional flow area of the supply slot is in the range of 6:1 to 9:1.

25. The casting shoe of claim 1, further comprising a plurality of axially spaced apart ribs projecting radially outwardly from the face of the body.

* * * * *